(12) United States Patent
Luginsland

(10) Patent No.: US 6,624,230 B2
(45) Date of Patent: Sep. 23, 2003

(54) MIXTURES COMPRISING A FILLER AND AN ORGANOSILICON COMPOUND

(75) Inventor: Hans-Detlef Luginsland, Köln (DE)

(73) Assignee: Degussa AG, Dusseldorf (DE)

( * ) Notice: Subject to any disclaimer, the term of this patent is extended or adjusted under 35 U.S.C. 154(b) by 0 days.

(21) Appl. No.: 09/833,801

(22) Filed: Apr. 13, 2001

(65) Prior Publication Data

US 2002/0022693 A1 Feb. 21, 2002

(30) Foreign Application Priority Data

Apr. 18, 2000 (DE) .......................... 100 19 554

(51) Int. Cl.⁷ .................................. C08K 3/36
(52) U.S. Cl. ..................... 524/492; 524/566; 524/575; 524/571; 524/574; 524/575.5; 524/262; 252/182.17
(58) Field of Search ................ 524/492, 566, 524/575, 571, 574, 575.5, 262; 252/182.17

(56) References Cited

U.S. PATENT DOCUMENTS

| | | | |
|---|---|---|---|
| 4,287,587 A | * | 9/1981 | Simshauser et al. .......... 327/50 |
| 5,650,457 A | | 7/1997 | Scholl et al. ................ 524/262 |
| 5,914,364 A | * | 6/1999 | Cohen et al. ................ 524/261 |
| 6,123,762 A | * | 9/2000 | Barthel et al. ........... 106/287.1 |
| 6,194,594 B1 | * | 2/2001 | Gorl et al. ................... 524/493 |

FOREIGN PATENT DOCUMENTS

| | | |
|---|---|---|
| EP | 0 680 997 | 11/1995 |
| EP | 0 732 362 | 9/1996 |
| EP | 0 864 605 | 9/1998 |

OTHER PUBLICATIONS

English language abstract of QR above.

* cited by examiner

*Primary Examiner*—Margaret G. Moore
(74) *Attorney, Agent, or Firm*—Pillsbury Winthrop LLP

(57) ABSTRACT

Mixture of at least one filler and organosilicon compounds of the general formula $Y-S_x-Z$, wherein the filler is surface-treated, hydrophobic, precipitated silica, are prepared by homogeneously applying an organosilicon compound from a nozzle to the surface-treated, hydrophobic, precipitated silica in a mixing unit at a temperature of less than 50° C. The mixture can be used in rubber mixtures.

10 Claims, No Drawings

MIXTURES COMPRISING A FILLER AND AN ORGANOSILICON COMPOUND

CROSS REFERENCE TO RELATED APPLICATIONS

The present application claims priority to German application 100 19 554.7 filed on Apr. 18, 2000, the subject matter of which is hereby incorporated by reference.

FIELD OF THE INVENTION

The present invention relates to mixtures of at least one filler and organosilicon compound, and to a process for their preparation and use.

BACKGROUND OF THE INVENTION

It is known that hydrolysable organofunctionalised silanes which are capable of reacting with fillers containing hydroxyl groups, such as, for example, natural and synthetic silicates, carbonates, glasses and metal oxides, are used in many fields of application for surface modification or for adhesion promotion. A number of such organofunctionalised silanes are used in rubber technology as adhesion promoters between filler and rubber (EP 501 227; Gummi, Fasem, Kunststoffe 51:416–424 (1998)). This is especially true of sulfur-containing alkoxysilanes of the general formula Y—$S_x$-Z, wherein Y is $R^1R^2R^3Si$—$R^4$, in which $R^1$, $R^2$, $R^3$ may be identical or independent of one another a $C_1$ to $C_4$ alky or a $C_1$ to $C_4$ alkoxy; $R^4$ may be a $C_1$, to $C_6$ linear or branched alkylidene; x is a number from 1 to 10; and Z is H, CN or, preferably, Y, It is also known that hydrolysable organofunctionalised silanes condense in the presence of liquid or surface-bonded water to form high molecular weight polysiloxanes. As a result, they may lose at least some of their activity, which is not acceptable from a technical or economical point of view (Silane Coupling Agents, sec. ed. Edwin P. Plueddemann, Plenum Press). In addition, such organofunctional silanes are mostly liquids and therefore frequently more difficult to handle in terms of processing technology than solid, pourable products.

Organofunctional silanes are also offered for sale and employed, especially for rubber technology, in the form of solid mixtures fixed to a carrier. Porous solids having a high absorptive capacity are predominantly used as carrier material. These carriers are used to absorb as much liquid silane as possible, do not to enter into a reaction with or promote a polycondensation reaction of the silane, and release the silane again completely and as quickly as possible during processing. In addition, the carrier material remaining in the product must not lead to an impairment of the properties of the product.

It is clear that good storage stability of the mixture is ensured when the carrier does not contain any moisture and/or surface-functional groups that are able to react with the organofunctional silane. A large number of different materials are being investigated for use as carriers, such as industrial carbon blacks, waxes, chalks, kaolins and natural or synthetic silicas. The various carrier materials differ not only in their absorptive capacity but also in their inertness towards the silane.

Mixing silanes with carbon black has proven to be advantageous in rubber technology with respect to adsorptive capacity, pourability and storage stability (DE 27 47 277). Organosilicon mixtures with white, untreated mineral carriers are disclosed in DE 22 55 577. WO 97/07165 describes organosilicon mixtures with dried silica as the carrier, such mixtures having to be stored in closed containers in order to minimize condensation. In the case of a product according to DE 22 55 577, a storage stability of only 3 months is guaranteed owing to its susceptibility to hydrolysis (product information reinforcing additive Si 69, X 50-S, X 50, Degussa AG).

Disadvantages asssociated with past silanes include the black colour of mixtures with carbon black (DE 27 47 277), which rules out use for colored products, poor storage stability (DE 22 55 577, WO 97/07165) owing to the moisture that is always present and reactive hydroxyl groups, and the low adsorptive capacity of wax.

SUMMARY OF THE INVENTION

The object of the invention is to provide a white organosilicon mixture that has improved storage stability.

The invention provides a mixture of at least one filler and organosilicon compound of the general formula Y—$S_x$-Z, wherein Y=$R^1R^2R^3Si$—$R^4$— and $R^1$, $R^2$, $R^3$ may be identical or different and represent a $C_1$ to $C_4$ alkyl or a $C_1$ to $C_4$ alkoxy, $R^4$ represents a linear or branched alkylidene having from 0 to 6 carbon atoms, preferably from 2 to 4 carbon atoms, x is a number from 1 to 10, preferably from 2 to 5, and Z represents H, CN or Y, characterized in that the filler is surface-treated, hydrophobic, precipitated silica.

There may preferably be used organosilicon compounds of the formula Y—$S_x$-Z wherein Y=$R^1R^2R^3Si$—$R^4$— and $R^1$, $R^2$, $R^3$ =methoxy or ethoxy, $R^4$ =$CH_2CH_2CH_2$, x is a number from 1 to 10, and Z represents H, CN or Y. Special preference is given to the use of organosilicon compounds of the formula $(C_2H_5O)_3Si$—$(CH_2)_3$—$S_x$—$(CH_2)_3$—$Si(OC_2H_5)_3$, . . . where x is a number from 1 to 10. The content of organosilicon compounds may be from 30 to 70 wt. %, preferably from 40 to 60 wt. %, based on the mixture.

The surface-treated, hydrophobic, precipitated silica may have a BET surface area of from 50 to 200 m²/g, preferably from 80 to 120 m²/g, a DBP adsorption of from 200 to 350 g/100 g, preferably from 210 to 250 g/100 g, and a moisture content of from 2 to 6%, preferably from 2.5 to 3.5%. Surface-treated, hydrophobic, precipitated silicas are known, for example, from DE 1 172 245 and DE 25 13 608 and are distinguished by an extremely low hydrodroxyl group density, low methanol wettability and a low moisture content. The high degree of hydrophobicity of the silica allows it to be used as a carrier material for the above-described hydrolysis-sensitive organosilanes. There may preferably be used the two hydrophobic silicas Sipemat D10 and Sipemat D17 from Degussa-Hüls AG.

The invention relates also to the preparation of the mixtures described above, in which the organosilicon compound is homogeneously applied from a nozzle to the surface-treated, hydrophobic, precipitated silica in a mixing unit at temperatures <50° C. The preparation of the mixture is generally complete after a short time. Trough-shaped powder mixers having a rotating propeller tool may be used as mixing units.

The mixture according to the invention may be used in rubber compositions. The mixtures may be added to the rubber composition in such an amount that from 0.1 to 50 wt. %, preferably from 0.1 to 20 wt. %, of organosilicon compound, based on the amount of rubber filler used, is added. The rubber compositions may contain at least one synthetic rubber and/or natural rubber and at least one silica and/or carbon black as rubber filler. Preferred synthetic rubbers are described, for example, in W. Hoffmann, Kautschuktechnologie, Genter Verlag, Stuttgart 1980 and may be polybutadiene (BR), polyisoprene (IR), solution/emulsion styrene/butadiene copolymers having styrene contents of from 1 to 60 wt. %, preferably from 5 to 50 wt. % (SBR), isobutylene/isoprene copolymers (IIR), butadiene/acrylonitrile copolymers having acrylonitrile contents of from 5 to 60 wt. %, preferably from 10 to 50 wt. % (NBR), partially hydrogenated or completely hydrogenated NBR rubber (HNBR), ethylene/propylene/diene copolymers (EPDM), as well as mixtures of those rubbers.

The rubber compositions may also contain rubber auxiliaries, such as, inter alia, reaction accelerators, reaction retardants, anti-ageing agents, stabilizers, processing auxiliaries, plasticizer, waxes, metal oxides as well as activators, such as triethanolamine, polyethylene glycol, and hexanetriol.

The rubber auxiliaries are used in conventional amounts, which are dependent inter alia on the intended use. Conventional amounts are, for example, amounts of from 0.1 to 50 wt. %, based on rubber. The organosilanes of the general structure Y—$S_x$-Z may be used alone as the cross linking agent. Generally, however, it is recommended to add at least one further cross linking agent. Sulfur or peroxides may be used as further cross linking agents. The rubber mixtures according to the invention may also contain vulcanization accelerators. Examples of suitable vulcanization accelerators are mercaptobenzthiazoles, sulfenamides, guanidines, thiurams, dithiocarbamates, thioureas and thiocarbonates. The vulcanization accelerators and sulfur or peroxides are used in amounts of from 0.1 to 10 wt. %, preferably from 0.1 to 5 wt. %, based on rubber.

Vulcanization of the rubber mixtures may take place at temperatures of from 80 to 200° C., preferably from 130 to 180° C., optionally under pressure of from 10 to 200 bar. The preparation of the rubber mixture may be carried out in conventional mixing units, such as rollers, internal mixers and mixing extruders.

The mixture according to the invention may be used in the production of molded bodies, especially tires, tire treads, cable coverings, hoses, drive belts, conveyor belts, roller coverings, shoe soles, gaskets, profile sections and damping elements.

DETAILED DESCRIPTION OF THE INVENTION

EXAMPLES

Example 1

Preparation of a Mixture According to the Invention

A 50:50 mixture consisting of hydrophobic silica having the trade name Sipernat D17 (Degussa-Hüls AG) and organopolysulfanesilane bis-(3-[triethoxysilyl]-propyl)-tetrasulfane (TESPT) having the trade name Si 69 (Degussa-Hüls AG) is prepared. Three kg of Sipernat D17 are placed in a FM 40 Henschel mixer having 4 mixing tools (1* device for clearing the bottom, 2* flat mixing tools, 1* horn-shaped mixing tool). Pre-mixing is carried out at 400 rpm and 20° C. for one minute, and then 3 kg of Si 69 are injected through a 0.3 mm nozzle at 40 bar, and when the addition is complete, the finished mixture is removed.

Example 2

Preparation of the Rubber Mixture

The recipe used for the preparation of the rubber mixtures is given in Table 1. In the Table, the unit phr means parts by weight based on 100 parts of the raw rubber used.

TABLE 1

| Substance | Comparison Example Amount [phr] | Example B1 Amount [phr] |
|---|---|---|
| 1st stage | | |
| Buna VSL 5025-1 | 96.0 | 96.0 |
| Buna CB 24 | 30.0 | 30.0 |
| Ultrasil VN3 | 80.0 | 80.0 |
| ZnO | 3.0 | 3.0 |
| Stearic acid | 2.0 | 2.0 |
| NaftolenZD | 10.0 | 10.0 |
| Vulkanox 4020 | 1.5 | 1.5 |
| Protector G35P | 1.0 | 1.0 |
| X50-S | 12.8 | — |
| Mixture Example 1 | — | 12.8 |
| 2nd stage | | |
| Batch stage 1 | | |
| 3rd stage | | |
| Batch stage 2 | | |
| Vulkacit D | 2.0 | 2.0 |
| Vulkacit CZ | 1.5 | 1.5 |
| Sulfur | 1.5 | 1.5 |

Polymer VSL 5025-1 is a solution-polymerised SBR copolymer from Bayer AG having a styrene content of 25 wt. % and a 1,2-butadiene content of 50%. The copolymer additionally contains 37.5 phr of oil. Polymer Buna CB 24 is a cis-1,4-polybutadiene (neodymium type) from Bayer AG having a cis-1,4 content of 97%, a trans-1,4 content of 2% and a 1,2 content of 1%.

Silica Ultrasil VN3 GR from Degussa-Hüls AG has a BET surface area of 175 $m^2$/g. The silane mixture used in the enclosed example is a 50:50 mixture of bis-(3-[triethoxysilyl]-propyl)tetrasulfane (TESPT) and N330 carbon black, known by the trade name X50-S (Degussa-Hüls AG). The aromatic oil used is Naftolen ZD from Chemetall; Vulkanox 4020 is PPD from Bayer AG, and Protektor G35P is an anti-oxidant wax from HB-Fuller GmbH. Vulkacit D (DPG) and Vulkacit CZ (CBS) are commercial products from Bayer AG. The rubber mixtures are prepared in three stages in an internal mixer as indicated in the table below (Table 2):

TABLE 2

| Stage 1 | |
|---|---|
| Settings | |
| Mixing unit | Werner & Pfleiderer E type |
| Friction | 1:1.11 |
| Speed | 70 $min^{-1}$ |
| Internal pressure | 5.5 bar |
| Volume when empty | 1.6 litres |
| Degree of filling | 0.55 |
| Flow temp. | 80° C. |
| Mixing operation | |
| 0 to 1 min | Buna VSL 5025-1 + Buna CB 24 |
| 1 to 3 min | 1/2 Ultrasil VN3, ZnO, stearic acid, Naftolen ZD, silane mixture |
| 3 to 4 min | 1/2 Ultrasil VN3, Vulkanox 4020, Protector G35P |
| 4 min | cleanse |
| 4 to 5 min | mix |
| 5 min | cleanse |

TABLE 2-continued

| | |
|---|---|
| 5 to 6 min | mix and complete the operation |
| Batch temp. | 140–150° C. |
| Storage | 24 h at room temperature |

Stage 2

Settings

| | |
|---|---|
| Mixing unit | as in stage 1 with the exception of: |
| Speed | 80 min$^{-1}$ |
| Degree of filling | 0.53 |
| Flow temp. | 80° C. |

Mixing operation

| | |
|---|---|
| 0 to 2 min | break up stage 1 batch |
| 2 to 6 min | maintain batch temperature at 150° C. by varying |
| 6 min | speed complete the operation |
| Batch temp. | 150–155° C. |
| Storage | 4 h at room temperature |

Stage 3

Settings

| | |
|---|---|
| Mixing unit | as in stage 1 with the exception of: |
| Speed | 40 min$^{-1}$ |
| Degree of filling | 0.51 |
| Flow temp. | 50° C. |

Mixing operation

| | |
|---|---|
| 0 to 2 min | stage 2 batch + Vulkacit CZ + Vulkazit D + sulfur |
| 2 min | complete the operation and form a sheet on a set of laboratory mixing rollers flow temperature 50° C.) homogenisation: cut 3* left, 3* right and fold over, and turn 8* with a narrow gap (1 mm) between the rollers and 3* with a wide gap (3.5 mm) between the rollers, and then draw out a sheet |
| Batch temp. | 85–95° C. |

The general process for the preparation of rubber mixtures and their vulcanates is described in "Rubber Technology Handbook", W. Hofmann, Hanser Verlag 1994. The vulcanization time for the test specimens is 60 minutes at 165° C. The test with respect to rubber technology is carried out according to the test methods indicated in Table 3.

TABLE 3

| Physical testing | Standard/conditions |
|---|---|
| ML 1 + 4, 100° C. | DIN 53 523/3, ISO 667 |
| Curemeter test, 165° C. | DIN 53 529/3, ISO 6502 |
| Tensile test on the ring, 23° C. | DIN 53504, ISO 37 |
| tensile strength | |
| tensile stress | |
| elongation at break | |
| Shore A hardness, 23° C. | DIN 53 505 |
| Viscoelastic properties, 0 and 60° C., 16 Hz, 50 N preliminary force and 25N amplitude force | DIN 53 513, ISO 2856 |
| complex modulus E*, loss factor tan δ | |
| Tear strength | DIN 53 507; ISO 34 |
| DIN abrasion, 10N force | DIN 53 516 |

Table 4 shows the rubber-technical data.

TABLE 4

| Mixture | | -1- Comparison Example | -2- Example B1 |
|---|---|---|---|
| Results for the crude mixture: | | | |
| ML 1 + 4 (1st mixing stage) | [ME] | 121 | 122 |
| ML 1 + 4 (3rd mixing stage) | [ME] | 70 | 67 |
| t10% | [min] | 1.36 | 1.40 |
| t90% | [min] | 28.0 | 27.3 |
| D120-Dmin at 165° C. | [dNm] | 17.6 | 18.9 |
| Results for the vulcanate: | | | |
| Shore A hardness | [SH] | 67 | 68 |
| Tensile strength | [MPa] | 14.7 | 15.2 |
| Tensile stress 100% | [MPa] | 2.4 | 2.4 |
| Tensile stress 200% | [MPa] | 6.2 | 6.1 |
| Tensile stress 300% | [MPa] | 11.9 | 11.4 |
| Elongation at break | [%] | 350 | 360 |
| Tear strength | [N/mm] | 14 | 19 |
| DIN abrasion | [mm3] | 69 | 77 |
| Dyn. tensile modulus E*(0° C.) | [MPa] | 26.8 | 30.1 |
| Dyn. tensile modulus E*(60° C.) | [MPa] | 9.7 | 10.4 |
| Loss factor tan δ(0° C.) | [] | 0.489 | 0.472 |
| Loss factor tan δ(60° C.) | [] | 0.133 | 0.126 |

It can be seen from Table 4 that the rubber properties of the white mixture containing the mixture according to the invention are comparable with those of the black comparison mixture.

Example 3

Storage Stability of Organosilane Preparations

The mixture described in Example 1 and the comparison example X 50 from Degussa-Hüls AG, prepared according to DE 2 255 577, are stored at ambient temperature in a tin. X 50 is a 1:1 mixture of Ultrasil VN 3 and Si69. At regular intervals, a 2 g sample is taken, extracted by shaking, while cold, with 100 ml of cyclohexane in an ultrasonic bath and filtered. The monomeric silane content is then determined by means of HPLC analysis. Silanes having a low degree of oligomerisation, which are known to continue to be rubber-active, are not determined with the method.

The amounts of organosilane found in relation to storage time are shown in Table 5. Owing to the incomplete extraction of the 50% organosilane used at the beginning, only 43.3% or 43.6% are recovered, and that value is therefore used as the reference value.

TABLE 5

| Storage time at RT [months] | 0 | 1.5 | 3 | 4.5 | 6 | 9 | 12 |
|---|---|---|---|---|---|---|---|
| Organosilane of Example 1 [wt. %] | 43.3 | 43.8 | 39.6 | | 37.3 | 35.9 | 34.0 |
| X 50 according to DE 22 55 577 [wt. %] | 43.6 | 39.8 | 32.6 | 27.3 | 24.6 | | |

As can be seen from Table 5, the loss of monomeric organosilane in the mixture after one year is only 9.3%, while the loss in the case of the comparison example is 19% after only ½ a year.

Example 4

Storage Stability of Rubber Mixtures

The mixture of Example 1 is studied in respect of rubber technology after various storage times (Table 6). In that table, the values of Example B1 are based on the comparison mixture (X50-S/reference with index 100%). The preparation of the mixtures was carried out as described in Example 2.

TABLE 6

| Storage time [months] Index [%] | 0 | 1.5 | 3 | 6 | 9 | 12 |
|---|---|---|---|---|---|---|
| Results for the crude mixture: | | | | | | |
| ML 1 + 4 (3rd mixing stage) | 96 | 122 | 101 | 99 | 105 | 107 |
| D120-Dmin at 165° C. | 108 | 112 | 99 | 105 | 106 | 112 |
| Results for the vulcanate: | | | | | | |
| Shore A hardness | 101 | 103 | 102 | 97 | 101 | 98 |
| Tensile strength | 103 | 102 | 110 | 107 | 90 | 102 |
| Tensile stress 200% | 98 | 100 | 94 | 97 | 94 | 105 |
| Elongation at break | 103 | 103 | 115 | 106 | 99 | 97 |
| Tear strength | 136 | 108 | 105 | 96 | 104 | 78 |
| DIN abrasion | 112 | 107 | 108 | 104 | 102 | 106 |
| Dyn. tensile modulus E*(0° C.) | 116 | 123 | 104 | 105 | 103 | 118 |
| Dyn. tensile modulus E*(60° C.) | 107 | 111 | 106 | 108 | 97 | 109 |
| Loss factor tan δ(0° C.) | 97 | 99 | 97 | 99 | 102 | 100 |
| Loss factor tan δ(60° C.) | 95 | 98 | 88 | 98 | 99 | 87 |

As will be seen from Table 6, the changes in dependence on the storage time lie within the range of variability of the measurements, so that the mixture can be regarded as being stable to storage.

Overall, the mixture according to the invention is distinguished by its white, pulverulent and dry state, as well as good incorporability and storage stability.

What is claimed is:

1. A mixture comprising at least one filler and at least one organosilicon compound of the general formula I:

Y—S$_x$-Z     (I), wherein:
Y=R$^1$R$^2$R$^3$Si—R$^4$—,
wherein:
R$^1$, R$^2$, and R$^3$ may be identical or different and are a C$_1$ to C$_4$ alkyl or a C$_1$ to C$_4$ alkoxy; and R$^4$ represents a linear or branched hydrocarbon chain having from 0 to 6 carbon atoms;
x is a number from 1 to 10;
Z is H, CN, or Y;
and wherein
the content of said organosilicon compound is from 30 wt. % to 70 wt. % based on the mixture;
said filler is a surface-treated, hydrophobic, precipitated silica; and
the loss of monomeric organosilicon compound in said mixture after one year is less than or equal to 9.3 wt. %.

2. The mixture of claim 1, wherein:
R$^1$, R$^2$, and R$^3$=ethoxy; and
R$^4$=CH$_2$CH$_2$CH$_2$.

3. The mixture of claim 1, wherein said surface-treated, hydrophobic, precipitated silica has: a BET surface area of from 50 m$^2$/g to 200 m$^2$/g; a DBP adsorption of from 200 g/100 g to 350 g/100 g; and a moisture content of from 2% to 6%.

4. The mixture of claim 3, wherein said surface-treated, hydrophobic, precipitated silica has: a BET surface area of from 80 m$^2$/g to 120 m$^2$/g; a DBP adsorption of from 210 g/100 g to 250 g/100 g; and a moisture content of from 2.5% to 3.5%.

5. The mixture according to claim 1, wherein said filler does not react with the organosilicon compound.

6. The mixture according to claim 1, wherein the weight ratio of the filler to the organosilicon compound is 1:1.

7. A process for the preparation of the mixture according to any one of claims 1 to 4, wherein said organosilicon compound is homogeneously applied from a nozzle to the surface-treated, hydrophobic, precipitated silica in a mixing unit at a temperature of less than 50° C.

8. A rubber composition comprising the mixture of any one of claims 1 to 4.

9. The rubber composition of claim 8, wherein said mixture is added in such an amount that from 0.1 wt. % to 50 wt. % of organosilicon compound, based on the amount of rubber filler used, is present in the final composition.

10. The rubber composition of claim 8, wherein said rubber composition comprises at least one synthetic rubber or natural rubber; and at least one of silica or carbon black as rubber filler.

* * * * *